United States Patent [19]
Wong-Insley

[11] Patent Number: 6,131,166
[45] Date of Patent: Oct. 10, 2000

[54] SYSTEM AND METHOD FOR CROSS-PLATFORM APPLICATION LEVEL POWER MANAGEMENT

[75] Inventor: Becky Wong-Insley, Sunnyvale, Calif.

[73] Assignee: Sun Microsystems, Inc., Palo Alto, Calif.

[21] Appl. No.: 09/256,826

[22] Filed: Feb. 24, 1999

Related U.S. Application Data

[63] Continuation of application No. 09/042,211, Mar. 13, 1998.

[51] Int. Cl.$^7$ .................................................. G06F 1/26
[52] U.S. Cl. .......................... 713/300; 713/320; 713/330; 709/302
[58] Field of Search ...................... 713/300, 320, 713/330, 201; 709/1, 101, 100, 302; 706/45; 707/10; 717/1, 4; 379/10

[56] References Cited

U.S. PATENT DOCUMENTS

| | | | |
|---|---|---|---|
| 5,675,814 | 10/1997 | Pearce ..................................... | 713/300 |
| 5,696,952 | 12/1997 | Fontarelli ................................ | 713/600 |
| 5,845,140 | 12/1998 | Stanley et al. ........................... | 713/322 |
| 5,953,536 | 9/1999 | Nowlin, Jr. .............................. | 713/323 |
| 5,978,923 | 11/1999 | Kou ........................................ | 713/323 |

OTHER PUBLICATIONS

"Advanced Configuration and Power Interface," ACPI—PC Webopaedia Definition and Links, http://webopedia.internet.com/TERM/A/A/ACPI.html, Dec. 22, 1998, pp. 1–2.
"1.6 ACPI Specification and the Structure of ACPI," ACPI—http://www.teleport.com/~acpi/acpihtml/topic7.htm, Dec. 28, 1998, pp. 1–2.
"3.1 System Power Mangement," ACPI—http://www.teleport.com/~acpi?acpihtml.topic23.htm, Dec. 28, 1998, pp. 1.
"OnNow Power Management Architecture for Applications," Microsoft OnNow Design Initiative White Paper, 1996–1997 Microsoft Corportation, pp. 1–19.

*Primary Examiner*—Ario Etienne
*Attorney, Agent, or Firm*—Conley, Rose & Tayon P.C.; B. Noel Kivlin

[57] ABSTRACT

A framework for the development of applications which manage the power resources and power states of power-manageable computer systems and attached devices. In one embodiment, the power management framework comprises a plurality of Java™ programming interfaces (APIs) which are part of the Java™ Platform. Therefore, the same framework is configured to enable the same power-aware Java™ applications to execute on many different computing platforms, operating systems, and computer hardware. The programming interfaces comprise a system-level programming interface, a notification programming interface, an exception programming interface, and a device-level programming interface. The system-level programming interface permits Java™ applications to obtain a current system power state and, with the proper privilege, to influence the current system power state. The notification programming interface permits Java™ applications to be notified regarding transitions from one system power state to another system power state. The exception programming interface permits Java™ applications to be notified regarding errors in power management. The device-level programming interface permits Java™ applications to obtain a current device power state and, with the proper privilege, to influence the current device power state. The power management framework defines a plurality of standardized system power states, standardized device power states, and power state transitions.

42 Claims, 6 Drawing Sheets

Relative Power Consumption

Relative Wakeup Latency

| System Power State | Device Power State |
| --- | --- |
| Full Power | D0 |
| PM Active | Transition from D0 to D3 |
| Sleep | D0 or D1 or D2 or D3 |
| Suspend | D0 or D1 or D2 or D3 |
| Off | D3 |

FIG. 7

SYSTEM AND METHOD FOR CROSS-PLATFORM APPLICATION LEVEL POWER MANAGEMENT

RELATED APPLICATIONS

This application is a continuation in part of U.S. Ser. No. 09/042,211 entitled "Java Application Level Power Management," filed Mar. 13, 1998, whose inventor was Becky Wong-Insley.

BACKGROUND OF THE INVENTION

1. Field of the Invention

The present invention relates generally to computer programming languages and more specifically to a method implemented in the Java™ programming language on the Java™ platform for allowing applications to participate in the power management of a computer system.

2. Description of the Relevant Art

In recent years, as advances in technology have led to smaller and cheaper computing devices, mobile computing has become increasingly popular. The portability of mobile computing devices is an attractive feature for users who cannot be tied down to a traditional, stationary desktop computer. Nevertheless, it is the very portability of mobile computing devices which leads to one of their biggest drawbacks: dependence on a finite power source such as a battery. Consequently, hardware and software architectures to extend battery life and otherwise manage power resources are a critical feature in the design of mobile computing devices. Power management is an important issue not only for mobile computing devices, but also for computer-based devices of all sorts: desktop computers, laptop computers, palmtop computers, network computers, personal digital assistants, embedded devices, smart phones, and other computing devices which may exist now or which may be developed in the future.

Another recent trend in computing is the trend towards cross-platform computing for increased interoperability of different types of computer hardware and software. The computing world currently has many different operating systems and hardware architectures which combine to form many disparate platforms. Because of the differences in both system software and underlying hardware among different platforms, software compiled for one platform usually cannot function on another platform. Therefore, developers who desire to create software for multiple platforms must incur the expense of porting software to the additional platforms, and consumers must eventually shoulder these costs. Furthermore, it is inconvenient and inefficient to maintain and deliver multiple system-specific software packages. One popular cross-platform solution to these problems is the Java™ Platform, a software platform for delivering and running the same applications on a plurality of different operating systems and hardware platforms. What sets the Java™ Platform apart is that it sits on top of these other platforms, in a layer of software above the operating system and above the hardware.

The Java™ Platform has two basic parts: the Java™ Virtual Machine, and the Java™ Application Programming Interface (Java™ API). While each underlying platform has its own implementation of the Java™ Virtual Machine, there is only one Virtual Machine specification. Because of this, the Java™ Platform can provide a standard, uniform programming interface which allows Java™ applets and applications to run on any hardware. The Java™ Platform is therefore ideal for the Internet, where one program should be capable of running on any computer in the world. The Java™ Platform is designed to provide this "write once, run anywhere" capability.

Developers use the Java™ Language and Java™ APIs to write source code for Java™-powered applications. A developer compiles the source code only once to the Java™ Platform, rather than to the machine language of an underlying system. Java™ programs compile to bytecodes which are machine instructions for the Java™ Virtual Machine. A program written in the Java™ Language compiles to a bytecode file which can run wherever the Java™ Platform is present, on any underlying operating system and on any hardware. In other words, the same exact Java™ application can run on any computing platform that is running the Java™ Platform.

Although the prior art has provided power management schemes, they are system-specific and thus inadequate for a cross-platform environment. The Microsoft OnNow power management initiative provides application programming interfaces (APIs) and specifies device-class-specific hardware requirements for power management. OnNow will allow an OnNow-compliant operating system running on OnNow-compliant hardware to determine power and configuration information about each OnNow-compliant device linked to the system. The OnNow-compliant operating system will control the power states for the OnNow-compliant devices and share this information with OnNow-compliant applications. However, the OnNow initiative is targeted only for Microsoft operating system environments such as Win32, Windows "Memphis," Windows NT version 5.0, and future versions thereof. Therefore, OnNow will not be implemented for other operating systems and for hardware platforms for which a Microsoft operating system is not available. As such, OnNow is a platform-specific solution that is not a "write once, run anywhere" method for applications which are intended to participate in power management. Furthermore, OnNow functions are performed at an operating system level and not at a higher level such as the Java™ Platform.

The Advanced Configuration and Power Interface (ACPI) is a power management specification developed by Intel, Microsoft, and Toshiba. ACPI is an interface specification, not a hardware or software specification, and it does not set forth APIs to be used by programmers. The ACPI interface gives an operating system direct control over the power management functions of a computer. For example, ACPI enables an ACPI-compliant operating system to control the amount of power given to ACPI-compliant devices attached to an ACPI-compliant computer. The ACPI specification comprises three run-time components: the ACPI Tables which describe the interfaces to the hardware, the ACPI Registers, and the ACPI BIOS which refers to the portion of the firmware that is ACPI-compliant. Nevertheless, there is no guarantee that ACPI will be implemented on computer systems built on anything other than Intel or compatible CPUs with Microsoft operating systems. As such, ACPI is not a "write once, run anywhere" solution for applications which are intended to participate in power management. Furthermore, ACPI functions are performed at an operating system level and not at a higher level such as the Java™ Platform.

Therefore, there is a need for a power management architecture that is a "write once, run anywhere" solution which operates on a plurality of hardware platforms and operating systems.

SUMMARY OF THE INVENTION

One or more of the problems outlined above may be solved by various embodiments of the system and method of the present invention. The invention provides a framework for the development of Java™ applications (including applets) to manage the power resources and power states of power-manageable computer systems and attached devices. The power management framework is part of the Java™ Platform, and therefore the same framework is operable on many different computing platforms without alteration. The Java™ Platform includes the Java™ Virtual Machine and the Java™ Application Programming Interfaces (APIs). The Java™ Virtual Machine is a specification of a "soft" computer which can be implemented in software or hardware. The Java™ APIs are reusable "building blocks" for Java™ developers which serve as interfaces between Java™ applications and the Java™ Virtual Machine.

In one embodiment, the invention comprises one or more Java™ programming interfaces or APIs which permit Java™ applications to participate in power management. To utilize the APIs, a Java™ programmer must make references to the APIs in the source code for a power-aware Java™ application. The programming interfaces for power management may comprise a system-level programming interface, a notification programming interface, an exception programming interface, and a device-level programming interface. Although the system-dependent details of the programming interfaces may be implemented by a developer for a particular computing platform, the power-management interfaces between the Java™ applications and the Java™ Virtual Machine remain standard across all computing platforms on which the Java™ Virtual Machine has been implemented, and therefore are standard across a plurality of different operating systems and underlying computer hardware.

In one embodiment, the system-level programming interface permits Java™ applications to obtain a current system power state and, with the proper privilege, to influence the current system power state. The power management framework defines a plurality of standardized, system-independent system power states which may represent the current power status of an entire computer system: full power, power management active, sleep, suspend, and off. A developer may map the system-independent power states to the system-dependent power states of the underlying computer system. The system-level programming interface includes methods for: getting a system power source, getting a system battery capacity, getting a system power state, adding a system state change event listener, removing a system state change event listener, setting a system power state, and getting a system power monitor object.

In one embodiment, the notification programming interface permits Java™ applications to be notified regarding transitions from one system power state to another system power state. The power management framework defines a plurality of valid power state transitions for which power-aware applications may be notified. The notification programming interface includes methods for: receiving a system state change event, getting a new power state, getting a previous power state, and determining if a power state change can be opposed.

In one embodiment, the exception programming interface permits Java™ applications to be notified regarding errors in power management. In one embodiment, the device-level programming interface permits Java™ applications to obtain a current device power state and, with the proper privilege, to influence the current device power state. The power management framework inherits from the ACPI standard a plurality of standardized device power states which may represent the current power status of a particular attached device: D0, D1, D2, and D3.

In one embodiment, the invention comprises a plurality of Java™ classes and a plurality of Java™ interfaces. System-level, notification, and exception objects can be instantiated from the classes when a system-specific power manager application implements the system-level and/or exception interfaces, when power-aware Java™ applications utilize the system-level and/or exception interfaces, and when power-aware Java™ applications implement the notification interface. The programming interfaces and Java™ applications are expressed in an object-oriented programming language with corresponding source code and machine language. The Java™ Platform translates the machine language into a machine language which is native to the underlying computing platform.

The applications and programming interfaces can, of course, be stored on any suitable storage medium.

BRIEF DESCRIPTION OF THE DRAWINGS

Other objects and advantages of the invention will become apparent upon reading the following detailed description and upon reference to the accompanying drawings in which:

FIG. 7 is an illustration of the relationship between system power states and device power states in one embodiment of the invention.

Figure 1:
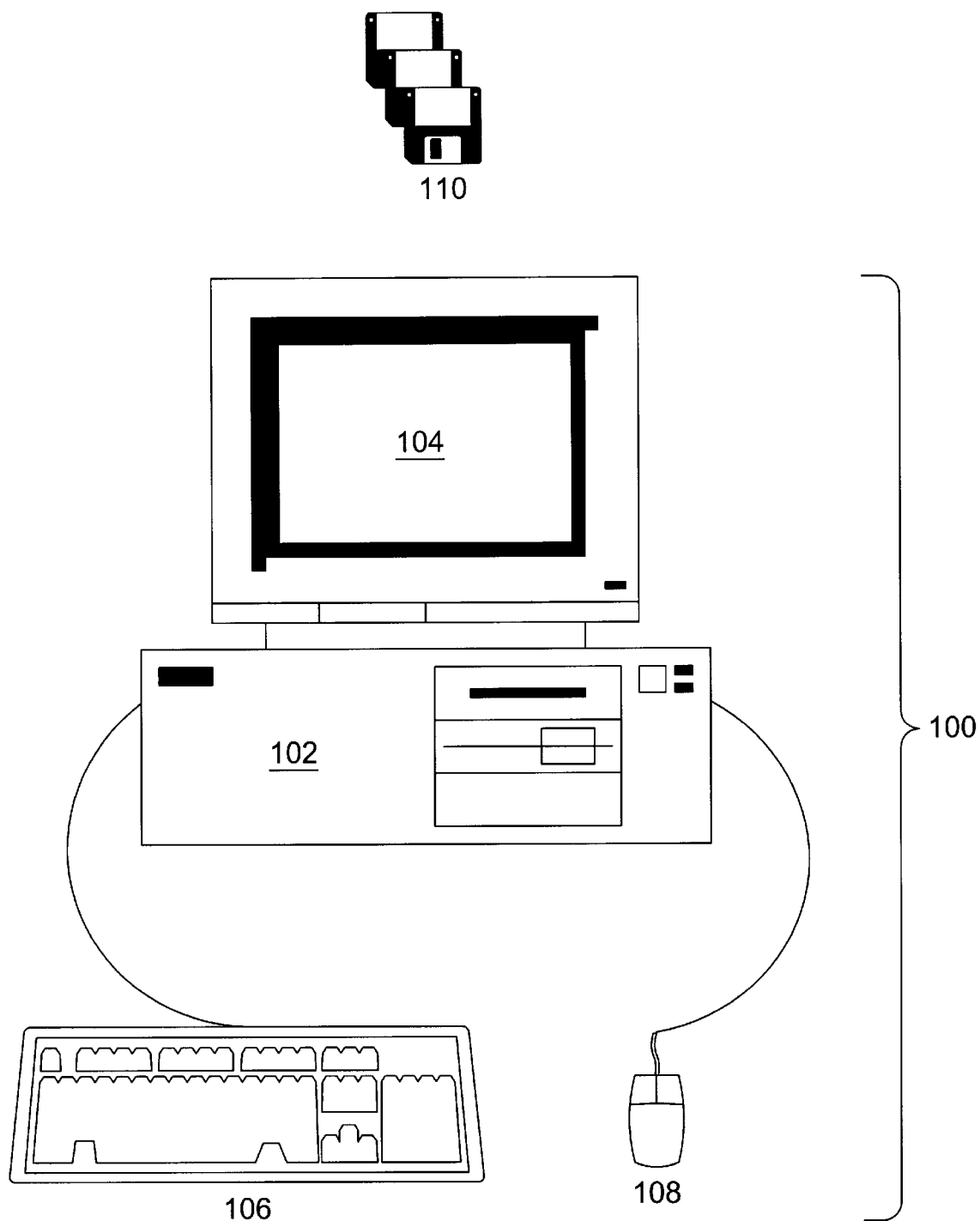
FIG. 1 (Prior Art) is an illustration of a computer system in one embodiment.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

One embodiment of the invention is described below. In this embodiment, a set or package of programming interfaces is implemented in the Java™ Language to provide one or more Java™ applications with the capability to manage the power resources and power states of the underlying computer system. As used herein, a programming interface is an application programmer interface or API: a set of routines, protocols, methods, variables, tools, and/or other resources for building software applications. Therefore, a single API can actually comprise a plurality of APIs of lesser scope. An API permits easier development of software by providing building blocks to the programmer.

FIG. 1 is an illustration of a computer system 100 in one embodiment. The computer system 100 comprises computer hardware 102, a display device such as a monitor 104, an alphanumeric input device such as a keyboard 106, and optionally a directional input device such as a mouse 108. The computer hardware 102 preferably comprises at least one central processing unit (CPU) and associated memory medium such as RAM and/or a nonvolatile memory such as a hard disk. The computer system 100 executes one or more computer programs 110. The computer programs 110 may comprise operating system or other system software, application software, utility software, Java™ applets, and/or any other sequence of instructions which are executed by the computer system 100. An operating system performs basic tasks such as recognizing input from the keyboard 106, sending output to the display screen 104, keeping track of files and directories on the disk, and controlling peripheral devices such as disk drives and printers. Application software runs on top of the operating system. Because applications take advantage of services offered by operating systems, and because operating systems differ in the services they offer and in the way they offer the services, an application must usually be designed to run on a particular operating system. The computer programs 110 are stored in a memory medium or storage medium. In various embodiments, the computer system 100 may comprise a desktop computer, a laptop computer, a palmtop computer, a network computer, a personal digital assistant (PDA), an embedded device, a smart phone, or any other computing device which may exist now or which may be developed in the future.

Together, the computer hardware 102 and the operating system define a computing platform. The programming interfaces of one embodiment of the present invention are cross-platform: they work on different computing platforms without alteration. Preferably, the programming interfaces are implemented in the Java™ Language for execution on the Java™ Platform.

The Java™ Language is an object-oriented programming language. In an object-oriented programming language, data and related methods can be grouped together or encapsulated to form an entity known as an object. The object is the fundamental building block of object-oriented programming. The data structures within an object may alternately be referred to as the object's state, its attributes, its fields, or its variables. In the Java™ Language, the data structures are normally referred to as the variables of the object. If the object represents a telephone, the variables may include a telephone number, a color and a type (e.g., touch-tone or pulse). The procedures which operate on the variables are referred to in Java™ as the methods of the object. In the telephone example, the methods could include ringing, receiving a call or placing a call. These methods will be discussed in more detail below. The variables and methods of an object may all be referred to as the members of the object.

In object-oriented programming, the grouping together of the variables and methods within an object is referred to as encapsulation. When the variables relating to an object and the methods which might affect the object are encapsulated within the object, other entities usually do not have direct access to these data and procedures. The other entities instead call on the object itself to invoke its own methods and thereby operate on its own data. The encapsulation of the members of the object thereby provides some protection for the data within the object and prevents unauthorized, unwanted, or unintended manipulation of the data. This is sometimes referred to as data hiding. (The concept of data hiding through encapsulation should be distinguished from the hiding of variables in Java™ variable declarations, as explained in more detail below.)

If a user wants to hide the data within an object, the variable which contains the data is made private. Private variables within an object may only be accessed by the methods of the object. Because it may, in some cases, be inconvenient or impractical to require manipulation of certain data through the methods of the associated object, some variables may be made public. These public variables are directly accessible to entities other than the object with which the variables are associated. Thus, in practice, the variables within objects normally comprise some which are hidden or inaccessible and some which are public.

All objects in an object-oriented programming system belong to a class, which can be thought of as a category of like objects which describes the characteristics of those objects. Each object is created as an instance of the class by a program. The objects may therefore be said to have been instantiated from the class. The class sets out variables and methods for objects which belong to that class. The definition of the class does not itself create any objects. The class may define initial values for its variables, and it normally defines the methods associated with the class (i.e., includes the program code which is executed when a method is invoked.) The class may thereby provide all of the program code which will be used by objects in the class, hence maximizing re-use of code which is shared by objects in the class.

Classes in the Java™ Language may be hierarchical. That is, some classes may be subclasses of a higher class, also known as a superclass. For example, in addition to the telephone class (i.e., superclass) above, subclasses may be created for mobile phones and speaker phones. An object which is instantiated from the mobile phone class will also be an object within the telephone class. It may therefore be treated as belonging to the narrower class of only mobile phones, or it may be treated as belonging to the broader class of telephones in general. In the Java™ Language, the subclass (e.g., mobile phones) is said to extend the superclass (e.g., telephones). Alternatively, the superclass is said to be extended by the subclass. For the purposes of this disclosure, a subclass is considered to extend all or any of the classes which are above it in the hierarchy. It may also be said that the subclass directly extends the class immediately above it in the hierarchy, and indirectly extends higher classes in the hierarchy. For example, if a parent class is extended by a first subclass and that subclass is in turn extended by a second subclass, the second subclass can be said to extend the parent class as well as the first subclass. This terminology will also be applied to the hierarchical structure of interfaces, which will be described in more detail below.

This hierarchical definition of classes and subclasses based on shared variables and methods is very useful. A subclass includes all the variables and methods in the class of which it is a member (its parent class). The subclass is said to inherit the variables and methods of its parent class. This property is useful in defining subclasses because only those variables and methods which do not appear in the parent class need to be defined in the subclass (although variables or methods which appear in the parent class may be redefined in the subclass.) This allows the code written in the parent classes to be re-used so that the programmer does not have to rewrite or cut and paste code into each new subclass. Methods which are defined in the parent class may, however, be redefined in subclasses. This is referred to as overriding or hiding the previously defined method(s). By redefining a variable which has already been defined in a superclass, the programmer may hide the previously defined variable (which is distinct from the object-oriented data-hiding concept inherent in encapsulation.) In some object-oriented languages, subclasses may inherit variables and methods from several classes. This is called multiple inheritance. If a subclass can only inherit from one parent class, this is called single inheritance. The Java™ Language is characterized by single inheritance, not multiple inheritance.

This hierarchical class structure also allows the programmer to take advantage of a property referred to as polymorphism. Polymorphism is a mechanism by which various objects may be handled in the same way externally, even though there are differences in the way they are handled internally. In other words, the interface which the different objects present to an external entity is the same for each object, but the details of each object's implementation may vary. This allows objects instantiated from different subclasses to be handled identically even though the subclasses are not identical. For example, assume that a drawing program implements a class for shapes, a subclass for circles, and a subclass for squares, each of which has a method called draw( ). While draw( ) will be implemented differently for the circle subclass and the square subclass, the drawing program does not have to know the details of how a shape will be drawn, or even which of the shapes is to be drawn. The drawing program simply calls the draw( ) method for the object to be drawn and the implementation defined in the object's class will be used.

Another important element of the Java™ Language is the interface. Interfaces are closely related to classes. Interfaces may declare what classes do, but not how they do it. For example, in the case of the telephone class above, an interface would declare that a telephone could ring, place calls, and receive calls, but it would not define the way in which this was accomplished. A telephone class, on the other hand, would set out the functions that define each of these actions so that when a telephone is instantiated, it can actually ring, place a call, or receive a call (in the context of the application). An interface may declare methods and/or constants. To utilize an interface, one or more classes must implement the interface.

Figure 2:
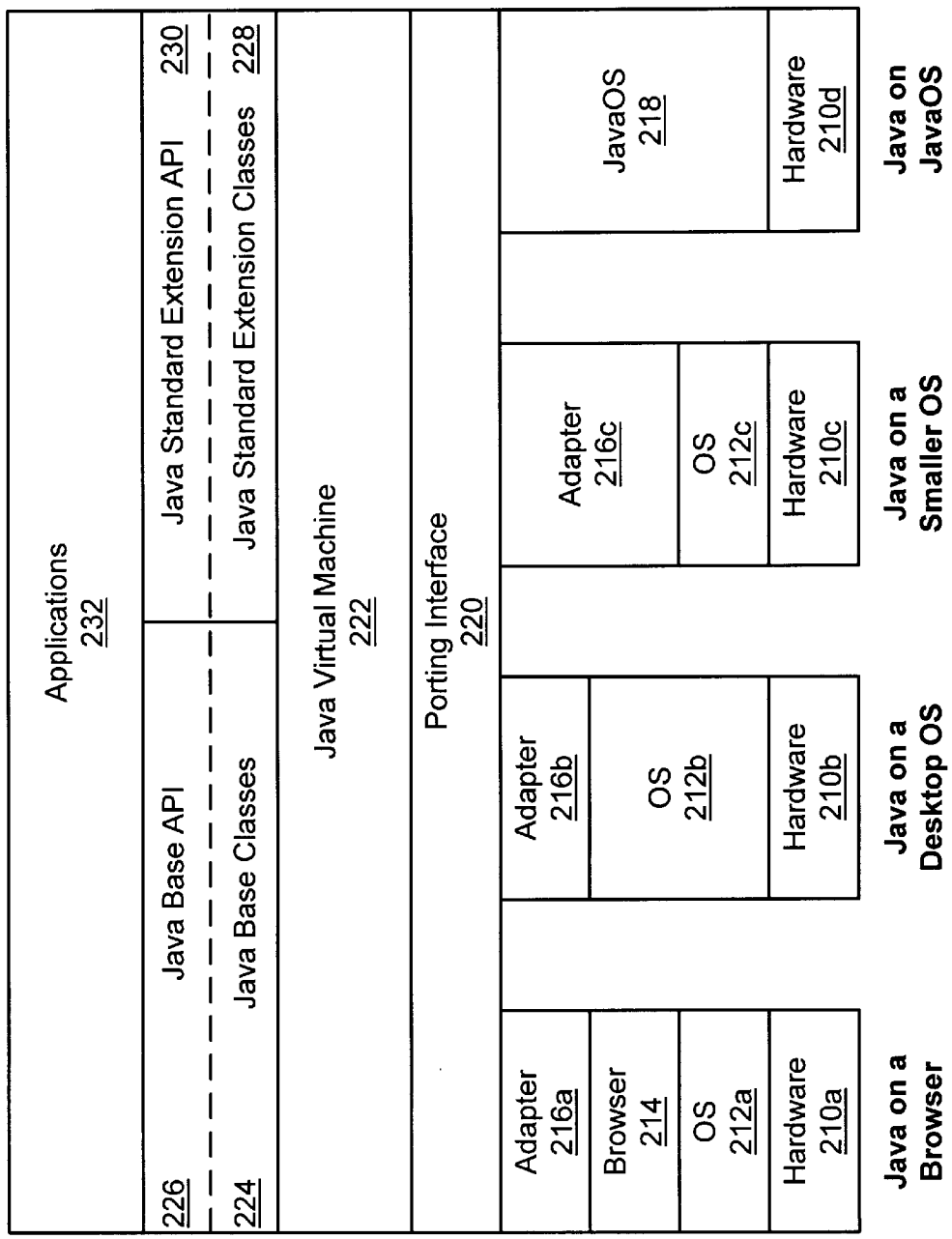
FIG. 2 (Prior Art) is an illustration of the Java™ Platform and the relationships between the elements thereof in one embodiment.

The Java™ Platform which utilizes the object-oriented Java™ Language is a software platform for delivering and running the same applications on a plurality of different operating systems and hardware platforms. The Java™ Platform sits on top of these other platforms, in a layer of software above the operating system and above the hardware. FIG. 2 is an illustration of the Java™ Platform and the relationships between the elements thereof in one embodiment. The Java™ Platform has two basic parts: the Java™ Virtual Machine 222, and the Java™ Application Programming Interface (Java™ API). While each underlying platform has its own implementation of the Java™ Virtual Machine 222, there is only one Virtual Machine specification. By allowing the Java™ applications 232 to execute on the same Virtual Machine 222 across many different underlying computing platforms, the Java™ Platform can provide a standard, uniform programming interface which allows Java™ applications 232 to run on any hardware The Java™ Platform is designed to provide this "write once, run anywhere" capability.

As used herein, "applications" includes applets as well as traditional desktop programs. Applets are Java™ programs that require a browser such as Netscape Navigator, Microsoft Internet Explorer, or Sun Microsystems HotJava to run. A browser is a piece of software that allows a user to locate and display Web pages, often encoded in HyperText Markup Language (HTML) and found on the Internet. Typically, applets are embedded in a Web page, downloaded over the Internet from the server, and run on a client machine. Because of security concerns, however, Java™ applets often do not have full access to system services such as read and write access to a file on disk. All Java™ applications 232 require the Java™ Platform to run.

Developers use the Java™ Language and Java™ APIs to write source code for Java™-powered applications 232. A developer compiles the source code only once to the Java™ Platform, rather than to the machine language of an underlying system. Java™ programs compile to bytecodes which are machine instructions for the Java™ Virtual Machine 222. A program written in the Java™ Language compiles to a bytecode file which can run wherever the Java™ Platform is present, on any underlying operating system and on any hardware. In other words, the same exact Java™ application can run on any computing platform that is running the Java™ Platform. Therefore, Java™ applications 232 are expressed in one form of machine language and are translated by software in the Java™ Platform to another form of machine language which is executable on a particular underlying computer system.

The Java™ Virtual Machine 222 is a "soft" computer that can be implemented in software or hardware. As used herein, in general a "virtual machine" is a self-contained operating environment that behaves as if it were a separate computer. As shown in FIG. 2, in one embodiment the Java™ Virtual Machine 222 is implemented in a software layer. The same Java™ Virtual Machine 222 can run on a variety of different computing platforms: for example, on a browser 214 sitting on top of an operating system (OS) 212a on top of hardware 210a; on a desktop operating system 212b on top of hardware 210b; on a smaller operating system 212c on top of hardware 210c; or on the JavaOS operating system 218 on top of hardware 210d. Computer hardware 210a, 210b, 210c, and 210d may comprise different hardware platforms. JavaOS 218 is an operating system that is optimized to run on a variety of computing and consumer platforms. The JavaOS 218 operating environment provides a runtime specifically tuned to run applications written in the Java™ Language directly on computer hardware without requiring an operating system.

The Java™ API forms a standard interface to Java™ applications 232, regardless of the underlying operating system or hardware. The API specifies a set of programming interfaces between Java™ applications 232 and the Java™ Virtual Machine 222. The Java™ Base API 226 provide the basic language, utility, I/O, network, GUI, and applet services. The Java™ Base API 226 is present anywhere the Java™ Platform is present. The Java™ Base Classes 224 are the implementation of the Java™ Base API 226. The Java™ Standard Extension API 230 provides additional capabilities beyond the Java™ Base API 226. The Java™ Standard Extension Classes 228 are the implementation of the Java™ Standard Extension API 230. Other APIs in addition to the Java™ Base API 226 and Java™ Standard Extension API 230 can be provided by the application or underlying operating system. Each API is organized by groups or sets. Each of the API sets can be implemented as one or more packages or namespaces. Each package groups together a set of classes and interfaces that define a set of related data, constructors, and methods, as is well known in the art of object-oriented programming.

The porting interface 220 lies below the Java™ Virtual Machine 222 and on top of the different operating systems 212b, 212c, and 218 and browser 214. The porting interface 220 is platform-independent. However, the associated adapters 216a, 216b, and 216c are platform-dependent. The porting interface 220 and adapters 216a, 216b, and 216c enable the Java™ Virtual Machine 222 to be easily ported to new computing platforms without being completely rewritten. The Java™ Virtual Machine 222, the porting interface 220, the adapters 216a, 216b, and 216c, the JavaOS 218, and other similar pieces of software on top of the operating systems 212a, 212b, and 212c may, individually or in combination, act as means for translating the machine language of Java™ applications 232, APIs 226 and 230, and Classes 224 and 228 into a different machine language which is directly executable on the underlying hardware.

Java™ Application-Level Power Management Framework

Power management is a feature that can be implemented by any computer systems or other computer-based devices wishing to control the power consumption of their power-manageable hardware. Desktop computers, mobile computers, network computers, and embedded devices are but a few examples. It is usually the case that mobile computing devices require more extensive power management functionality, but this does not stop the other classes of devices from taking advantage of power management functions.

Power management is inherently OS- and hardware-dependent. This is because different operating systems have different power management architectures, and hardware devices have their own power management characteristics. For example, if an application requests to retrieve the current system power state, then depending upon the platform that the application is running on, different operating systems will return a different power state value with a different meaning. In order to achieve the "write once, run anywhere" paradigm that characterizes the Java™ Platform, it is necessary to have an applicationlevel power management framework to provide a standardized interface for application developers.

In a preferred embodiment, the Java™ application-level power management framework comprises a set of standardized, system-independent system power states, a set of standardized device power states which is inherited from an industry standard, a set of well defined power state transitions, and a set of programming interfaces (i.e., APIS) for power management which provide a channel for applications to participate in power management. The power management APIs are divided into four categories: system-level, device-level, notification, and exception. The system-level APIs allow applications to inquire about and influence a system-wide power status. The device-level APIs allow applications to inquire about and influence device-level power statuses. The notification APIs handle communications between applications and system software (for example, a Java™ power manager application) for system power state transitions. The exception APIs handle error reporting.

Figure 3:
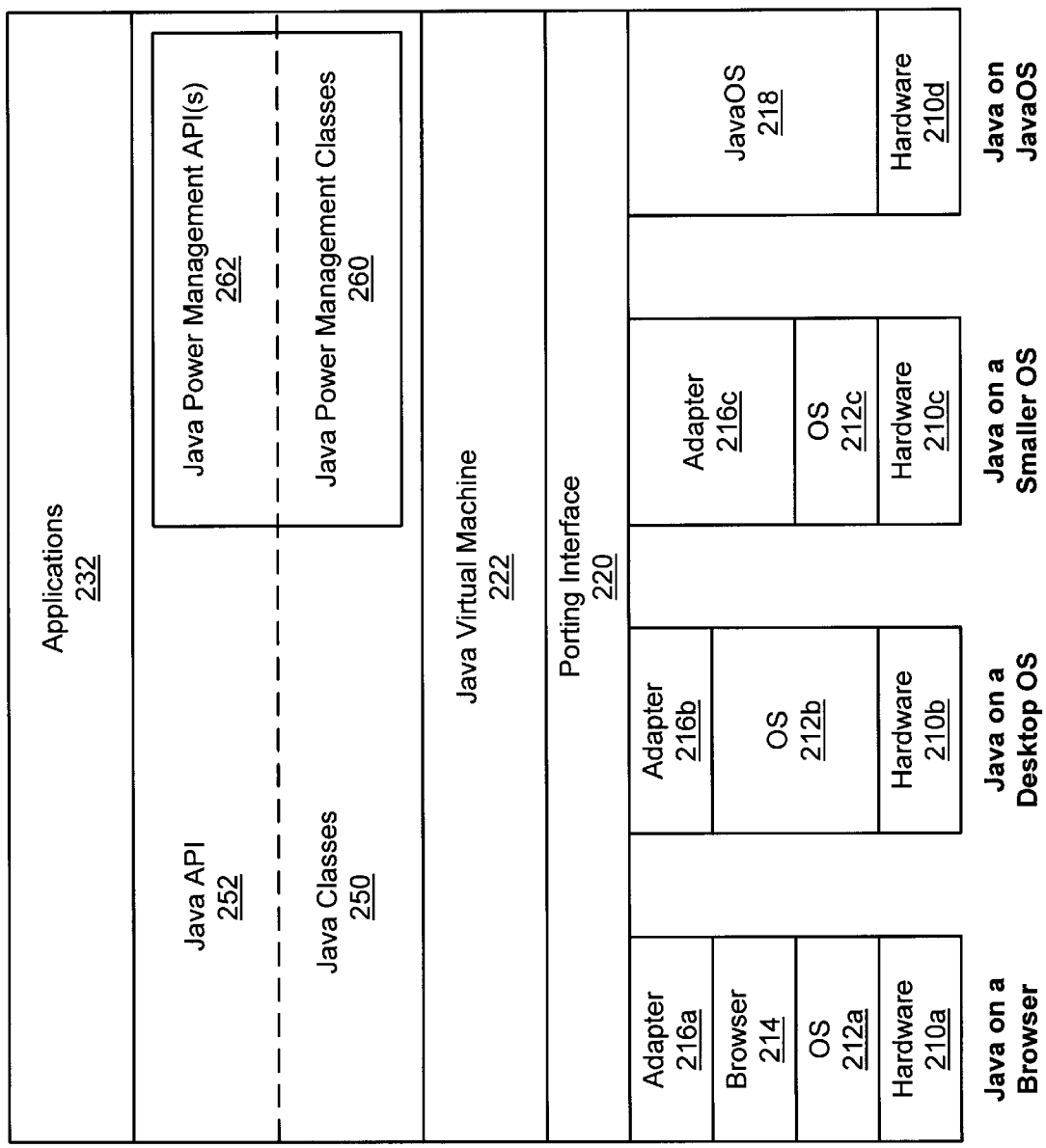
FIG. 3 is an illustration of the Java™ Platform including Java™ Power Management in one embodiment of the invention.

FIG. 3 is an illustration of the Java™ Platform including Java™ Power Management in one embodiment of the invention. The Java™ API 252 comprises all of the API sets available to the applications 232: the Java™ Base API 226, optionally the Java™ Standard Extension API 230, and additional APIs. The Java™ API 252 also encompasses the Java™ Power Management API or APIs 262, the programming interfaces between applications 232 and the Java™ Virtual Machine 222 for managing the power states and power resources of the computer system. The Java™ Classes 250 are the implementation of the Java™ API 252, including the Java™ Base Classes 224, optionally the Java™ Standard Extension Classes 228, and additional classes. The Java™ Power Management API(s) 262 are implemented by the Java™ Power Management Classes 260.

Therefore, as shown in FIG. 3, this application-level power management framework is implemented in a software layer of APIs and classes between the Virtual Machine 222 and the Java™ Applications 232. The application-level power management framework is thus executable on a variety of different computing platforms, and consequently on a variety of different operating systems and a variety of different computer hardware.

Standardized System Power States

Figure 4:
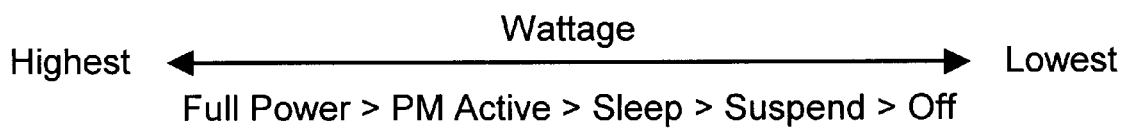
FIG. 4 is an illustration of the relative power consumption of different system power states in one embodiment of the invention.
Figure 5:
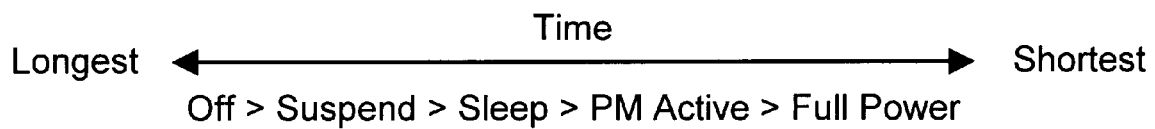
FIG. 5 is an illustration of the relative wakeup latency of different system power states in one embodiment of the invention.

The Java™ Power Management framework in one embodiment of the present invention defines five system-independent system power states: Full Power, PM (Power Management) Active, Sleep, Suspend, and Off. These system power states define a power status for the entire computer system, including the operating system and the underlying hardware. The set of system power states not only provides a homogeneous environment for applications, but it is also comprehensive enough to fulfill most needs of today's operating systems and hardware devices. The differences between the power states are power consumption and the time latency required for the system to power up to a working state. FIG. 4 is an illustration of the relative power consumption of different system power states in one embodiment of the invention. Power consumption and performance are highest in the Full Power state and lower in each subsequent state. FIG. 5 is an illustration of the relative wakeup latency of different system power states in one embodiment of the invention. Wakeup latency is longest in the Off state and shorter in each subsequent state.

The purpose of having standardized power states is to provide a well-defined and unified view for the applications so that the applications receive consistent power state information across different computing platforms. API developers can choose to implement a subset of the states that are relevant to their operating and application environments. According to the OS power management framework and the characteristics of the hardware devices, API developers can map the system-dependent power states of the underlying computing platform to the standardized, system-independent power states in the Java™ layer. The following paragraphs explain each standardized power state in detail and list potential hardware requirements.

Full Power: In the Full Power state, applications are executed at the maximum possible performance that a system can provide. In this state, the system is not power managed. When performance is preferred over power savings, and power resource is ample, users or applications may choose to disable power management and therefore keep the system in the Full Power state.

PM Active: In the PM (Power Management) Active state, the power consumption of a system is actively regulated by power management software: for example, by a power management policy manager. The OS is fully operational, and applications are executed in a normal fashion and can participate in influencing system power management decisions at all times. Applications and the OS can utilize powermanaged devices at all times; although the responses from the devices may not be instantaneous, the devices will return to a fully functional state in a user-transparent way. System power consumption in this state is less than in the Full Power state because the system and hardware devices are being power managed. The Full Power state and the PM Active state are also called the OS Active States because the OS is fully operational in these two states.

Sleep: In the Sleep state, the system appears to be off, no processor cycles are executed, and thus no application code is executed. An important characteristic of the Sleep state is that the system can wake up and return to its prior working state with a relatively low wakeup latency. When the system is entering the Sleep state, the OS needs to ensure that the memory context is preserved properly so that the system can wake up to its previous working environment. In general, applications do not need to perform any special preparations. However, for an application that requires pre-conditioning prior to the system entering the Sleep state, the application should perform the appropriate actions immediately to prepare itself (and if necessary, its associated hardware) so that it can be restored automatically upon wakeup. The Sleep state can provide substantial power savings over the OS Active States mentioned above. These savings are achieved by removing power from, or by placing into low power modes, as much of the system as possible. The low wakeup latency is achieved by preserving system memory context and hardware state in a low latency persistent storage device such as self-refresh DRAM, battery-backed RAM, NVRAM, or another such storage medium; thus a "sleeping" system can return to its previous working environment without rebooting. Power consumption in this state is very low. This state can be used to implement an "instant on" feature.

Suspend: The Suspend state is very similar to the Sleep state except that the system memory context and hardware states are saved in high-latency, non-volatile backup storage such as a hard disk, a flash ROM, or another such storage medium. A system consumes less power in the Suspend state than in the Sleep state. This is because the system memory context and hardware states are saved in non-volatile backup storage that do not require power. Therefore, the power to the main system, which includes CPU and memory, can be removed completely. System wakeup latency is higher in the Suspend state than in the Sleep state, but system state and memory context can be retrieved from the non-volatile backup store, so system operations can be resumed without a complete reboot.

Off: In the Off state, the processor is stopped, all applications are exited, and applications should perform their proper shutdown operations prior to the system entering the Off state. If there are uninterruptible operations in progress, applications may query the user for the proper actions to take. The system also performs shutdown procedures before entering the Off state. Therefore, any running processes may be terminated by the system shutdown process, the system may terminate or query the user for appropriate actions for all applications still running during the shutdown process. In the Off state, no memory context or hardware state information is preserved. The only way for an Off state system to get back to the OS Active States is via reboot. The Off state has the lowest power consumption of all the states but has the highest latency to bring the system back to an OS Active State.

System Power State Transitions

Figure 6:
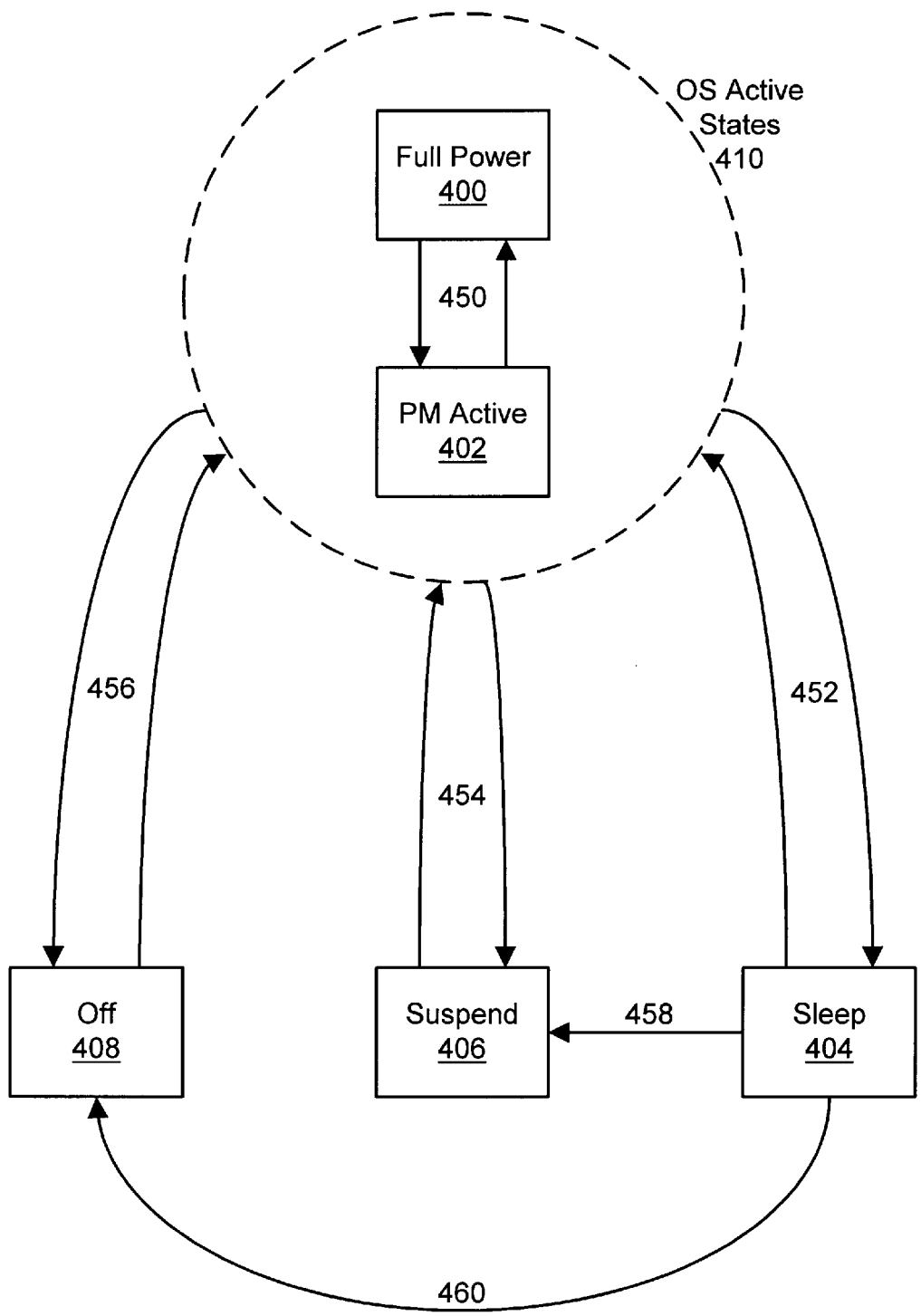
FIG. 6 is an illustration of the system power states and system power state transitions in one embodiment of the invention.

The Java™ Power Management framework in one embodiment of the present invention defines a set of power state transitions. Each power state transition is a transition from one system power state to another system power state. This definition provides a unified and consistent guideline for the applications to participate in, respond to, and act upon power-management-related run-time activities. The system power state transitions can be activated by various sources. For example, software requests, system activity level, interrupts, and external events can cause a system to transit from one power state to another. Application developers should use the power state transitions as a guideline to write applications that are power-aware, meaning that they are designed to be involved in the system power management activities and decisions. FIG. 6 is an illustration of the system power states and system power state transitions in one embodiment of the invention.

Full Power 400 to/from PM Active 402: Full Power 400 and PM Active 402 are the OS Active States 410 in which the OS is capable of dispatching and executing user applications and system threads. This state transition 450 is user- and application-transparent, meaning that applications do not need to react to this state transition 450. The system power management software (for example, a Java™ power manager) may choose not to send state change notification for this transition 450, so that it can power manage the system more efficiently. The transition 450 between Full Power 400 and PM Active 402 can be initiated by the user: for example, with an instruction to disable or enable power management explicitly. The transition 450 between Full Power 400 and PM Active 402 can also be initiated by applications that participate in system power management activities and decisions: for example, by an application that implements power management policy. In these states, hardware devices change their power states dynamically according to the policy or requests by applications. An application-initiated transition between these two states is user-transparent. Hardware devices may not be able to respond to requests instantaneously because the devices may be power managed, but the system is fully responsive and is able to service any application requests and external events.

OS Active States 410 to/from Sleep 404: When a system is going to undergo a transition 452 from one of the OS Active States 410 to Sleep 404, the system power management software will send a notification to applications that are currently running. Applications may respond to the state change notification. It is the responsibility of the OS to ensure that the memory context is preserved properly, so the system can wake up and return to its prior working environment automatically. In general, this state transition 452 does not require special preparations from applications. However, a system may transit from Sleep 404 to Off 408 unexpectedly under some emergency situations, such as loss of power or total battery depletion. To prevent the user and applications from loss of critical data under such circumstances, it is recommended that applications perform some kind of auto-save actions to save critical data before the system enters the Sleep state 404. There are applications which require software preparations prior to the system entering the Sleep state 404. These applications should immediately respond to the state change notification sent by the system power management software and should perform their appropriate actions in such a way that their data and execution state can be restored properly and automatically when the system wakes up. If there are uninterruptible operations in progress, these applications may query the user for proper actions. The system power management software or OS may grant a grace period for these applications to perform their appropriate operations before putting the system to Sleep 404. This grace period is strictly dependent upon the particular system software and/or OS implementation. The OS must ensure that all system activities are quiesced (for example, no outstanding I/O activities, all processes are stopped, user and system data are preserved), before the memory context is preserved in a low-latency persistent storage, such as self-refresh DRAM. This transition 452 can be triggered in many ways. For example, the user can press a pre-programmed switch, issue a command, or tailor the power management policy to put the system into Sleep state 404 under some pre-defined circumstances (for example, after the system has idled for some period of time, or at an appointed time). When a sleeping system wakes up, the OS resumes execution of the system and applications to the previous working environment automatically. A sleeping system can undergo a transition 452 back to OS Active States 410 via some hardware events, such as pressing a switch (for example, a power switch), or via an external event such as a telephone ring for a modem, or an alarm from a preset system timer. A battery operated system can be forced to transit to Sleep 404 when a low battery condition is encountered. In this case, the system cannot transit back to OS Active States 410 unless sufficient power resource is available.

OS Active States 410 to/from Suspend 406: Similar to the transition 452 between the OS Active States 410 and Sleep 404, when a system is going to undergo a transition 454 from an OS Active State 410 to Suspend 406, the OS must also ensure that the application data and system memory context are preserved properly in non-volatile storage, so that the system can be restored and resumed back to the previous execution state. In general, applications do not need to perform special preparations. However, for those applications that require software preparations prior to the system entering the Suspend 406 state, they should perform the same kind of preparation procedures as described for the transition 452 between the OS Active States 410 and Sleep 404. This transition can be initiated in the same fashion as for the transition 452 between the OS Active States 410 and Sleep 404. The difference is that the system memory context is saved in non-volatile persistent storage which does not require power.

OS Active States 410 to/from Off 408: Applications should perform their shutdown operations and exit before the system undergoes a transition 456 from an OS Active State 410 to Off 408. If there are any uninterruptible operations in progress, applications should query the user for proper actions. The OS must also perform system shutdown operations before entering the Off state 408. Any running processes and applications will be taken care of by the system shutdown procedure; they may be terminated or queries may be sent to the user for proper actions. No application or system context is preserved when the system is in the Off state 408. The system power management software or the OS may grant a grace period for the applications to perform their shutdown operations before the system shutdown procedure starts. The grace period is strictly system software and OS implementation dependent. This transition 456 can be triggered by mechanical means: for example, pressing a power switch, unplugging the power cable from the electrical outlet, or removing the battery from the system. Users and applications can also request a system to transit to the Off state 408 when the system and its memory context are no longer needed. A battery operated system can be forced to transit to the Off state 408 when the battery is totally depleted. The only way for a system in the Off state 408 to go back to an OS Active State 410 is via reboot. In addition, a system cannot enter an OS Active State 410 from the Off state 408 unless a power switch is pressed and there is sufficient power available to the system.

Sleep 404 to Suspend 406: In this transition 458, the system is already in the Sleep state 404. Applications that require pre-conditioning prior to the system entering the Sleep state 404 must have performed the preparations described in the transition 452 between the OS Active States 410 and Sleep 404. A system that chooses to support this transition must contain both types of backing storage, namely both low latency and high latency non-volatile storage. In addition, the OS must be able to save the system context to the backing storage. The mechanism to transit a sleeping system to Suspend 406 is dependent upon the system and OS implementation. In general, it is recommended that the transition 458 should be implemented in such a way that a system can be transited directly from Sleep 404 to Suspend 406, instead of waking up and putting the sleeping system back into OS Active States 410, and then putting it to the Suspend state 406. A system developer or a user may define a power management policy in which the system can transit from Sleep 404 to Suspend 406 under some circumstances. For example, the state transition 458 can be triggered by a pre-programmed timer or when the system encounters a low battery emergency.

Sleep 404 to Off 408: In this transition 460, the system is already in the Sleep state 404. Applications that require pre-conditioning prior to the system entering the Sleep state 404 must have performed the preparations described in the transition 452 between the OS Active States 410 and Sleep 404. This transition 460 can occur in a sleeping system via various circumstances: for example, when power is no longer sufficient to back up the memory context preserved in the power-backed persistent storage, when the power source is removed, or when the system battery becomes totally discharged. In these cases, the saved memory context is lost and the system is forced to enter the Off state 408.

Standardized Device Power States

The Java™ Power Management framework in one embodiment of the present invention defines four general device power states: D0, D1, D2, and D3. These device power states define a power status for a particular hardware device. The device power states are defined according to the Advanced Configuration and Power Interface (ACPI) specification. In the ACPI specification, Intel and Microsoft have already established an industry standard for USB, PCI, FireWire 1394, and other various buses and devices, and the power management characteristics for these buses and devices are also part of the standard. In addition, the set of ACPI device power states is also generic enough to support legacy devices. Explanations of the different device power states are set forth in the following paragraphs.

D0: The device is fully on, completely active, and responsive to application requests. Devices in this state consume the most power but have maximum performance. Devices are expected to continuously remember all relevant device context when operating in the D0 state.

D1: The device is being power managed. The meaning of the D1 state is device-specific. The device may respond to application requests, but the response time may not be instantaneous. In general, the D1 state is expected to consume less power than the D0 state and to preserve more device context than the D2 state. The D1 state may not be defined by many devices.

D2: The device is being power managed. The meaning of the D2 state is device-specific. The device may respond to application requests, but the response time may not be instantaneous. The D2 state may have higher response latency than the D1 state. In general, the D2 state is expected to consume less power than the D1 state and preserve less device context than the D1 state. The D2 state may not be defined by many devices.

D3: The device is fully off, there is no power to the device. When a device enters the D3 state, device context is lost. The device is no longer responsive to application requests. When the device is powered back on, OS software needs to re-initialize the device before it can service application requests.

FIG. 7 is a table illustrating the relationship between the standardized system power states and the standardized device power states in one embodiment of the invention.

When the system is in the Full Power state, all devices must be in D0 state. In other words, power management is disabled.

When the system is in the PM Active state, device power management is utilized extensively. As shown in FIG. 7, devices transit from D0 to D3 according to power management policy, system activities, and requests from applications. For example, if a mobile device is being used to make a presentation, the only devices that may need to be active while the presentation is being given are the display and pointing device. A presentation application can request that the system power management policy manager keep the display on-line (probably in the D0 state) while the rest of the system and devices can be in the D3 state or in one of the low power (D1, D2) states. When any power managed device is required by other applications or the OS, it can transit back to D0 state.

When the system is in the Sleep state, the OS is not active in order to achieve maximum power savings. Devices may be put into D3 state except for the power source that is used to maintain the system memory context. If some devices can wake the system from the Sleep state, those devices may be put into one of the Dx states (D0, D1, D2, or D3) as shown in FIG. 7. For example, a personal digital assistant (PDA) can be put into the Sleep state (in which the system context is kept warm in the memory but the rest of the peripherals are in D3 state) to save battery life when it is not being used or when it is idle for a period of time. The PDA can be turned on instantly when it is needed again.

The Suspend state is similar to the Sleep state, except that the power source that is used to maintain the system memory context is no longer needed. For example, if a device is used to receive a fax at night, the fax receiving application can request that the policy manager turn on the wake up feature for the fax modem. When the system is put into the Suspend state and the rest of the peripherals are put into D3 state at night, the fax modem can be put into one of the low power (D1, D2) states. When a fax is received, the modem can generate an interrupt to wake up the system to receive the fax.

As shown in FIG. 7, when the system is in the Off state, devices must be in D3 state.

Power Management Programming Interfaces

In a preferred embodiment, the Java™ power management framework comprises a package of programming interfaces (APIs). As described above, APIs are reusable "building blocks" which provide functionality to application programs and/or other programs. The package of programming interfaces for power management can comprise as many as four APIs or categories of APIs: system-level, device-level, notification, and exception. The APIs are interfaces between Java™ applications and the Java™ Virtual Machine. As shown with reference to FIG. 3, the APIs are implemented by one or more classes in a layer of software between the Java™ applications and the Virtual Machine. The APIs and the applications comprise Java™ source code and/or bytecodes which are executable by the Virtual Machine. Therefore, the APIs can generally be implemented without alteration on any underlying computing platform on which the Java™ Virtual Machine has been implemented. Consequently, because of the widespread implementation of the Java™ Virtual Machine, the APIs can be implemented with ease on a plurality of operating systems and computer hardware. The power management APIs thus enable Java™ applications to participate in power management in a standardized, cross-platform manner.

The APIs are used by Java™ applications to participate in the management of the power resources and power states of the underlying computer software and hardware. The typical power resources and power states have been described in detail above.

Programmers and/or developers who intend their Java™ applications to participate in power management can make their applications power-aware by including in their programs references to the power management APIs. The programmers and/or developers would utilize the power management APIs, for example, by writing Java™ source code which creates instances of objects from power management classes, references power management variables, and/or invokes power management methods provided by the APIs. In this way, power-aware Java™ applications are implemented on top of the power management APIs, which in turn are implemented on top of the Java™ Virtual Machine. The specific classes, methods, variables, and other elements of the APIs are set forth in detail below.

Although the system-dependent details of the APIs may be implemented differently by developers for different underlying computing platforms, the power-management programming interfaces between the Java™ applications and the Java™ Virtual Machine remain standard across all computing platforms on which the Java™ Virtual Machine has been implemented, and therefore are standard across a plurality of different operating systems and underlying computer hardware. Therefore, an application which makes use of the APIs on one underlying computing platform will work reliably on another underlying computing platform with a different implementation of the APIs. The APIs can be utilized by Java™ applications which run on systems that have a well-defined OS-level power management framework, on simple systems that do not need an elaborate power management infrastructure, or on systems in between. Because applications can be executed only when the OS is active, the APIs too can be utilized by applications only when the OS is operational.

Java™ classes are hierarchical in nature, and the power management APIs fit into that established hierarchy. The Java™ class hierarchy of a preferred embodiment is as follows:

class java.lang.Object
      class java.util.EventObject (implements java.io.Serializable)
        class org.mncrs.pm.SystemStateChangeEvent
      class org.mncrs.pm.SystemPowerMonitor (implements org. mncrs.pm. SystemPowerStates)
      interface org.mncrs.pm.SystemPowerStates
      interface org.mncrs.pm.SystemStateChangeListener (extends java.util.EventListener)

class java.lang.Throwable (implements
java.io.Serializable)
   class java.lang.Exception
      class org.mncrs.pm.PowerManagementException Therefore, in a preferred embodiment the Java™ power management framework comprises a plurality of interfaces and a plurality of classes. The interfaces must be implemented in at least one class. The interfaces declare methods and/or constants, but the interfaces do not define the exact manner in which the methods are implemented. The details of a particular implementation of an interface are defined in the classes which implement that interface by the program code for the corresponding methods. Therefore, the actual program code which will be executed when these interface methods are invoked is dependent upon the particular implementation of the interfaces which a programmer chooses to use. Thus, the interfaces provide means for programmers to develop individual, independent components of an application which allows applications to participate in power management, yet still ensure compatibility between the components.

In a preferred embodiment, the power management APIs are contained in a Java™ package named org.mncrs.pm. The value of the property named org.mncrs.pm.power-manager.impl contains the class name of a system's Java™ power manager implementation. Systems that support Java™ application-level power management must set this property; otherwise, no Java™ power management support will be granted. The Java™ power manager class provides the implementation of the necessary power management APIs. For a Java™-enabled operating environment, there may optionally exist an OS-based power management implementation, and thus the implementation of the power management APIs may be native to the system.

More detailed information concerning the individual APIs is set forth as follows.

System-Level Programming Interface

The Java™ Power Management framework allows Java™ applications to participate in power management of the underlying computer system via a system-level API. For example, the system-level API permits Java™ applications to obtain a current system power state, i.e., one of the five states described in detail above, and to influence the system power state. As used herein, "influence the system power state" refers to setting, changing, or modifying the system power state, or requesting to set, change, or modify the system power state, by an application which has the proper privilege level. In a preferred embodiment, the system-level API for power management comprises an interface named org.mncrs.pm.SystemPowerStates and an abstract class named org.mncrs.pm.SystemPowerMonitor.

The standardized system power states, as described above, are preferably declared as constants in public interface SystemPowerStates:

public static final int Full_Power
   public static final int PM_Active
   public static final int Sleep
   public static final int Suspend
   public static final int Off The public abstract class SystemPowerMonitor extends Object and implements the SystemPowerStates interface. This abstract class is a common superclass which contains the methods utilized by normal applications to retrieve operating-system-dependent information related to power management. The implementation of this class requires platform-specific knowledge. This class is intended and should be implemented by system vendors/developers and should be used for their system-specific power manager implementation. Therefore, in one embodiment, the system-level programming interface is the only one of the Java™ Power Management interfaces that may be platform dependent.

The variables of SystemPowerMonitor are preferably as follows:

protected static SystemPowerMonitor instance
   public static final int AC_Powered
   public static final int Battery_Powered There should only be one SystemPowerMonitor object in a system. The constructor of SystemPowerMonitor, which creates the instance of the sole SystemPowerMonitor object and prevents the instantiation of another instance, is preferably as follows:

protected SystemPowerMonitor ( )

In a preferred embodiment, the methods of SystemPowerMonitor are: getSystemPowerSource( ), getBatteryCapacity( ), getSystemPowerState( ), addSystemStateChangeListener (SystemStateChangeListener), removeSystemStateChangeListener (SystemStateChangeListener), setSystemPowerState(int, boolean), and getInstance( ). The methods and their explanations are set forth as follows:

getSystemPowerSource
   public abstract int getSystemPowerSource( ) throws PowerManagementException Get the power source of the system. Normal applications use this method to find out the power source of the system. If the system is powered by AC, AC_Powered is returned. If the system is powered by battery, Battery_Powered is returned. If the power source cannot be determined by the system, applications will receive a PowerManagementException with error code Unknown_Power_Source.

Returns: AC_Powered or Battery_Powered
   Throws: PowerManagementException

A PowerManagementException with error code Unknown_Power_Source must be thrown if the power source of the system cannot be determined (for example, if the power source is neither AC_Powered nor Battery_Powered).

getBatteryCapacity
   public abstract int getBatteryCapacity( ) throws PowerManagementException Get the remaining battery capacity of a system. The remaining capacity is represented by a percentage. It is a composite value which represents the total remaining capacity of all the batteries in a system; its granularity and accuracy are determined by the underlying platform. (Battery information for individual devices may be obtained by using the Device-Level APIs.)

Returns: percentage of remaining battery/batteries capacity
   Throws: PowerManagementException A PowerManagementException with error code No_Battery_In_System must be thrown if the system does not have a battery. A PowerManagementException with error code Battery_Capacity_Info_Not_Available must be thrown if the remaining capacity percentage cannot be retrieved from the system. For example, some battery controllers or battery drivers may not report battery status when a system is powered by AC.

getSystemPowerState public abstract int getSystemPowerState( )

Get the current system power state. Normal applications use this method to query the current system power state.

Returns: current system power state addSystemStateChangeListener public abstract synchronized void addSystemStateChangeListener (SystemStateChangeListener listener)

Add a SystemStateChangeEvent listener. Normal applications that are interested in the SystemStateChangeEvent should implement the SystemStateChangeListener class and use this method to register themselves to the event listeners list.

Parameters: listener—the listener object removeSystemStateChangeListener public abstract synchronized void removeSystemStateChangeListener (SystemStateChangeListener listener)

Remove a SystemStateChangeEvent listener. Normal applications that are SystemStateChangeEvent listeners use this method to remove themselves from the event listeners list.

Parameters: listener—the listener object setSystemPowerState public abstract void setSystemPowerState(int state, boolean force) throws PowerManagementException Puts the system in the state specified in the parameter "state". Normal applications should not call this method. The implementation of this method must perform the system-dependent security check to guarantee that only privileged applications are allowed to access or initiate this method call. This is because this method will initiate a system state transition. Failure to implement access-control security protection and/or policy for this method may result in serious system damage.

Parameters:

state—the state that the system is going to transit to force—If force is true, force the system to change state. No queries should be sent to the user during the state change process. In circumstances like a low-power emergency shutdown, force should be set to true. If force is false, allow queries to be sent to the user from the state change process. The caller of the method can send out messages and/or user queries for notifications about the status of the call.

Throws: PowerManagementException

A PowerManagementException must be thrown with error code State_Transition_Failure if an error is encountered during the state change process. A PowerManagementException must be thrown with error code Illegal_State$_{13}$ Transition_Request if an unrecognized "state" value is passed to the method or when there is an invalid state transition request.

getInstance public static SystemPowerMonitor getInstance( ) throws PowerManagementException Normal applications use this method to get the sole instance of this object.

Returns: the instance of SystemPowerMonitor Object

Throws: PowerManagementException

A PowerManagementException must be thrown with error code No_Power_Manager if the SystemPowerMonitor instance cannot be found.

Device-Level Programming Interface

The Java™ Power Management framework allows Java™ applications to participate in power management of power-manageable devices which are linked to the computer system via a device-level API. For example, the device-level API permits Java™ applications to obtain a current device power state, i.e., one of the four states described in detail above, and to influence the device power state. As used herein, "influence the device power state" refers to setting, changing, or modifying the device power state, or requesting to set, change, or modify the device power state, by an application which has the proper privilege level. The device-level API may designate the standardized device power states, inherited from the ACPI industry standard, as described in detail above.

Notification Programming Interface

The Java™ Power Management framework provides a notification API which allows the system power management software to notify power-aware applications of state change events (i.e., the power state transitions as described in detail above). In other words, applications may use the notification API to obtain notification data relating to state change events. Power-aware applications should use the notification API to keep track of the state change activities and should respond to the events immediately and properly. The applications may oppose or delay the state change by sending back an error response to the state change notification, and the action taken as a result to the error response is dependent upon the implementation of the power manager implementation. In a preferred embodiment, the notification API comprises an interface named org.mncrs.pm.SystemStateChangeListener and a class named org.mncrs.pm.SystemStateChangeEvent.

The public interface SystemStateChangeListener, which extends EventListener, is an event listener interface for receiving objects of the class SystemStateChangeEvent. Normal applications that require software preparations before the system transits from the Full_Power or PM_Active state to the Sleep, Suspend, or Off state should implement this interface. Any normal applications that are interested in the system state transition activities may also implement this interface. The application should create a listener object and use the addSystemStateChangeListener method in the SystemPowerMonitor object to register with the SystemStateChangeEvent source. When a SystemStateChangeEvent occurs, the rcvStateChange method in the listener object is invoked, the SystemStateChangeEvent object is passed to the listener, and the listener can get information about the event and respond to the event.

The method of the SystemStateChangeListener interface is preferably as follows:

rcvStateChange public abstract void rcvStateChange (SystemStateChangeEvent evt) throws PowerManagementException Invoked when the system is going to change state, or has changed state.

Parameters:

evt—the event object SystemStateChangeEvent

Throws: PowerManagementException

A PowerManagementException with error code Keep_Current_State may be thrown by the listener if the listener wants to oppose to the current state change event. The listener should use the isUrgent method in the SystemStateChangeEvent object to examine if the state change event can be opposed. If the return value from the isUrgent method call is true, the PowerManagementException thrown by the listener will be ignored by the event source; otherwise, the exception will be serviced by the event source. The response to the exception is system-dependent.

The public class SystemStateChangeEvent, which extends EventObject, defines an event object that is used to send system power state change notifications. This event object should be created only by the system-specific power manager implementation. Normal applications should be the event listeners. Normal applications should use the getNewState and getPrevState methods to make queries for system power state information, and should use the isUrgent method to determine if the state change event can be opposed. A SystemStateChangeEvent can be initiated only when the operating system is operational. The following describes when a SystemStateChangeEvent is valid and the valid state transitions.

A SystemStateChangeEvent may be delivered before one of the following state transitions take place: Full_Power to PM_Active, PM_Active to Full Power, Full Power to Sleep, Full Power to Suspend, Full_Power to Off, PM_Active to Sleep, PM_Active to Suspend, PM_Active to Off. A SystemStateChangeEvent may be delivered after one of the following state transition has taken place: Sleep to Full_Power Sleep to PM_Active, Suspend to Full_Power, Suspend to PM_Active. No SystemStateChangeEvent can be delivered for the following state transition: Sleep to Suspend.

The SystemStateChangeEvent class preferably contains the following variables:
  protected int theNewState
  protected int thePrevState
  protected boolean urgency The SystemStateChangeEvent class preferably contains the following constructor:
  SystemStateChangeEvent
  protected SystemStateChangeEvent(object source, int prevState, int newState, boolean urgent)
  Construct a SystemStateChangeEvent.
  Parameters:
  source—source of the event
  thePrevState—the state at the time when the event object is created.
  theNewState—the state that the system is going to transit to.
  urgent—If urgent is true, any objections to the state change event from normal applications will be ignored: the PowerManagementException (with error code Keep_Current_State) sent by the event listeners (normal applications) will be ignored, and the state transition will occur. If there is an emergency state change event, urgent should be set to true: for example, a low power emergency shutdown. If urgent is false, objections to the current state change event will be attended: the PowerManagementException (with error code Keep_Current_State) sent by the event listeners (normal applications) will be attended. It is recommended that the state change may be aborted or delayed when there are objections to the state change; however, actions take to service the exception is implementation dependent.

In a preferred embodiment, the methods of SystemStateChangeListener are: getNewState( ), getPrevState( ), and isUrgent( ). The methods and their explanations are set forth as follows:
  getNewState
  public int getNewState( )
  Get the new state that the system is going to transit to.
  Returns: theNewState
  getPrevState
  public int getPrevState( )
  Get the previous state, which is the state at the time when the event object is created.
  Returns: thePrevState
  isUrgent
  public boolean isUrgent( )
  Determine if the state change event can be opposed. If the returned value is true, then the event source will ignore the PowerManagementException (with error code Keep_Current_State) thrown by the event listeners. The state transition will occur. If the returned value is false, then the event source will respond to the PowerManagementException (with error code Keep_Current_State) thrown by the event listeners. The kind of response to the exception is system-dependent.
  Returns: true or false Exception Programming Interface The Java™ Power Management framework provides an exception API which allows the system power management software to notify power-aware applications of errors in power management. In other words, applications may use the exception API to obtain exception data or exception information relating to errors in power management. In a preferred embodiment, the exception API for power management comprises a class named org.mncrs.pm.PowerManagementException.

The public class PowerManagementException, which extends Exception, is thrown when an error related to power management is encountered. Different errors can be identified by the error code. Method getErrCode can be used to retrieve the error that causes the exception. Error codes No_Power_Manager, Illegal_State_Transition_Request, State_Transition_Failure, Battery_Capacity_Info_Not_Available, No_Battery_In_System, and Unknown_Power_Source must be used by the subclass of SystemPowerMonitor to indicate various system-related power-management errors. Error code Keep_Current_State should be used by the SystemStateChangeEvent listener when the listener wants to oppose to the current state change event.

The PowerManagementException class preferably contains the following variables to represent error conditions:
  public static final int No Power_Manager
  public static final int Illegal_State_Transition_Request
  public static final int State_Transition_Failure
  public static final int Battery_Capacity_Info_Not_Available
  public static final int No_Battery_In_System
  public static final int Unknown_Power_Source
  public static final int Keep_Current_State The PowerManagementException class preferably contains the following constructor:
  PowerManagementException
  public PowerManagementException(int err, String msg) throws IllegalArgumentException
  Constructs a PowerManagementException object with an error code and a detailed message.
  Parameters:
  err—the error code that is used to create the exception object msg—the detailed message
  Throws: IllegalArgumentException
  thrown for an unrecognized error code.

The PowerManagementException class preferably contains the following method:
getErrCode
public int getErrCode( )
Get the error code.
Returns: the error code that is used to construct the exception object.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A system which forms an application-level framework for providing management of power resources and power states of software and hardware of a power-manageable computer system, said application-level framework being configured to execute on a virtual machine, said virtual machine being implemented on a plurality of computing platforms, the system comprising:
   a CPU, wherein said CPU is operable to execute a plurality of instructions expressed in a first machine language;
   one or more power-managed devices coupled to said CPU;
   a virtual machine, wherein said virtual machine is operable to execute a plurality of instructions expressed in a second machine language, and wherein said virtual machine is executable by said CPU;
   a memory coupled to said CPU, wherein said memory stores said virtual machine and a package of programming interfaces;
   wherein said package of programming interfaces is executable by said virtual machine to enable a plurality of applications to manage power resources and power states of the computer system, including power resources and power states of said CPU and said power-managed devices, wherein said package of interfaces is executable to enable said applications to obtain a current system power state, to enable said applications to influence said current system power state, and to enable said applications to obtain notification data regarding a plurality of transitions from said current system power state to a new system power state;
   wherein said virtual machine is selected from a plurality of virtual machines which are implemented on top of a plurality of different operating systems and a plurality of different computer hardware, wherein said package of programming interfaces is configured to enable said applications to be executed without alteration on said plurality of virtual machines on said plurality of different operating systems and said plurality of different computer hardware.

2. The system of claim 1,
   wherein said package of programming interfaces are implemented in a software layer which includes other programming interfaces, wherein the package of programming interfaces and the other programming interfaces are interfaces between said applications and said virtual machine.

3. The system of claim 1,
   wherein said applications are implemented in said second machine language and are executable by said virtual machine.

4. The system of claim 1, further comprising:
   means for translating said plurality of instructions in said second machine language into said plurality of instructions in said first machine language.

5. A method for managing power resources and power states of software and hardware of a computer system, the method being configured to execute without alteration on a plurality of computing platforms, the method comprising:
   providing a package of programming interfaces for power management of the computer system, wherein said package of programming interfaces is configured to enable a plurality of applications to participate in managing power resources and power states of power-manageable software and hardware of the computer system, wherein said package of programming interfaces is configured to enable said applications to obtain power state data, wherein said power state data reflects a power state of said power-manageable software and hardware of the computer system, wherein said package of programming interfaces further includes one or more object-oriented classes for power management, and wherein said package of programming interfaces is further configurable to instantiate one or more objects for power management from said one or more classes; and
   implementing said package of programming interfaces between said applications and the computer system, wherein said interfaces are configured to enable said applications to be computing-platform-independent.

6. The method of claim 5,
   wherein said applications and said programming interfaces are configured to execute on a virtual machine, and wherein said programming interfaces are interfaces between said applications and said virtual machine.

7. The method of claim 5,
   wherein said package of programming interfaces is further configured to enable said applications to obtain a system power state and to permit said applications to influence said system power state.

8. The method of claim 7,
   wherein said system power state is selected from the group consisting of: full power, power management active, sleep, suspend, and off.

9. The method of claim 7,
   wherein said package of programming interfaces is further configured to map a plurality of system-independent power states to a plurality of system-dependent power states.

10. The method of claim 7,
    wherein said package of programming interfaces is further configured to provide one or more methods for power management selected from the group consisting of: getting a system power source, getting a system battery capacity, get ting said system power state, adding a system state change event listener, removing said system state change event listener, setting said system power state, and getting a system power monitor object.

11. The method of claim 5,
    wherein said package of programming interfaces is further configured to enable said applications to obtain notification data regarding a plurality of power state transitions.

12. The method of claim 11,
    wherein said power state transitions are selected from the group consisting of: full power to power management active, power management active to full power, full power to sleep, full power to suspend, full power to off, power management active to sleep, power management active to suspend, power management active to off, sleep to full power, sleep to power management active, suspend to full power, suspend to power management active, and sleep to suspend.

13. The method of claim 11, wherein said package of programming interfaces is further configured to inform said applications of an event indicating a power state transition.

14. The method of claim 13, wherein said event indicating said power state transition is selected from the group consisting of: full power to power management active, power management active to full power, full power to sleep, full power to suspend, full power to off, power management active to sleep, power management active to suspend, power management active to off, sleep to full power, sleep to power management active, suspend to full power, and suspend to power management active.

15. The method of claim 11, wherein said package of programming interfaces is further configured to provide one or more methods for power management selected from the group consisting of: receiving a system state change event, getting a new power state, getting a previous power state, and determining if a power state change can be opposed.

16. The method of claim 5, wherein said package of programming interfaces is further configured to enable said applications to obtain exception data regarding errors in power management.

17. The method of claim 5, wherein said package of programming interfaces is further configured to enable said applications to obtain a device power state and permit said applications to influence said device power state.

18. The method of claim 17, wherein said package of programming interfaces is further configured to designate a plurality of standardized device power states.

19. A storage medium which stores programming interfaces for platform-independent power management of software and hardware of a computer system, wherein the programming interfaces comprise:

a system-level programming interface for power management of the computer system, wherein said system-level programming interface is configured to enable a plurality of applications to obtain data indicating a system power state and enable said applications to influence said system power state;

a notification programming interface for power management of the computer system, wherein said notification programming interface is configured to enable said applications to obtain notification data regarding a plurality of power state transitions;

wherein said system-level programming interface and said notification programming interface are implemented between said applications and the computer system;

wherein said system-level programming interface and said notification programming interface are configured to be utilized by said applications, wherein said interfaces are configured to enable said applications to be executed without alteration on a plurality of different computing platforms.

20. The storage medium of claim 19, wherein said applications and said programming interfaces are executable on a virtual machine, wherein said virtual machine is implemented on said plurality of different computing platforms.

21. The storage medium of claim 19, further comprising: an exception programming interface for power management of the computer system, wherein said exception programming interface is configured to enable said applications to obtain exception data regarding errors in power management.

22. The storage medium of claim 19, further comprising: a device-level programming interface for power management of the computer system, wherein said device-level programming interface is configured to enable said applications to obtain data indicating a device power state and enable said applications to influence said device power state.

23. A system which forms a framework for cross-platform application-level power management of a power-manageable computer, the system comprising:

a CPU;

a memory coupled to said CPU, wherein said memory stores one or more programming interfaces executable by said CPU and a plurality of applications executable by said CPU;

wherein said programming interfaces are configured to enable said applications to participate in power management of power states and power resources of software and hardware of the computer;

wherein said applications are expressed in a first sequence of instructions, wherein said first sequence of instructions is executable on a plurality of different computing platforms without alteration;

wherein said programming interfaces are expressed in a second sequence of instructions, wherein said second sequence of instructions is executable on a plurality of different computing platforms without alteration.

24. The system of claim 23, further comprising: a virtual machine; wherein said first sequence of instructions and said second sequence of instructions are executable by said virtual machine.

25. The system of claim 24, wherein said virtual machine is a computer program which is stored in said memory.

26. The system of claim 23, wherein said programming interfaces are further configured to enable said applications to obtain data indicating a system power state and to enable said applications to influence said system power state.

27. The system of claim 23, wherein said programming interfaces are further configured to enable said applications to obtain notification data regarding a plurality of power state transitions.

28. A method for managing power resources and power states of software and hardware of a computer system, the method being configured to execute without alteration on a plurality of computing platforms, the method comprising:

providing a package of programming interfaces for power management of the computer system, wherein said package of programming interfaces is configured to enable a plurality of applications to participate in managing power resources and power states of power-manageable software and hardware of the computer system, wherein said package of programming interfaces is configured to enable said applications to obtain power state data, wherein said power state data reflects a power state of said power-manageable software and hardware of the computer system;

providing a virtual machine, wherein said applications and said programming interfaces are configured to execute on said virtual machine, wherein said virtual machine is configured to be implemented on a plurality of different computing platforms;

wherein said programming interfaces are interfaces between said applications and said virtual machine, wherein said interfaces are configured to enable said applications to be executable without alteration on any computing platform on which the virtual machine is configured to execute.

29. The system of claim 28,
wherein said programming interfaces are further configured to enable said applications to obtain data indicating a system power state and to enable said applications to influence said system power state.

30. The system of claim 28,
wherein said programming interfaces are further configured to enable said applications to obtain notification data regarding a plurality of power state transitions.

31. A method for managing power resources and power states of software and hardware of a computer system, the method being, configured to execute without alteration on a plurality of computing platforms, the method comprising:

providing a package of programming interfaces for power management of the computer system, wherein said package of programming interfaces is configured to enable a plurality of applications to participate in managing power resources and power states of power-manageable software and hardware of the computer system, wherein said package of programming interfaces is configured to enable said applications to obtain power state data, wherein said power state data reflects a power state of said power-manageable software and hardware of the computer system;

implementing said package of programming interfaces between said applications and the computer system, wherein said interfaces are configured to enable said applications to be computing-platform-independent;

wherein said package of programming interfaces is further configured to enable said applications to obtain a system power state and to permit said applications to influence said system power state; and wherein said package of programming interfaces is further configured to map a plurality of system-independent power states to a plurality of system dependent power states.

32. The method of claim 31,
wherein said applications and said programming interfaces are configured to execute on a virtual machine, and wherein said programming interfaces are interfaces between said applications and said virtual machine.

33. The method of claim 31,
wherein said system power state is selected from the group consisting of: full power, power management active, sleep, suspend, and off.

34. A method for managing power resources and power states of software and hardware of a computer system, the method being configured to execute without alteration on a plurality of computing platforms, the method comprising:

providing a package of programming interfaces for power management of the computer system, wherein said package of programming interfaces is configured to enable a plurality of applications to participate in managing power resources and power states of power-manageable software and hardware of the computer system, wherein said package of programming interfaces is configured to enable said applications to obtain power state data, wherein said power state data reflects a power state of said power-manageable software and hardware of the computer system;

implementing said package of programming interfaces between said applications and the computer system, wherein said interfaces are configured to enable said applications to be computing-platform-independent;

wherein said package of programming interfaces is further configured to enable said applications to obtain a system power state and to permit said applications to influence said system power state; and wherein said package of programming interfaces is further configured to provide one or more methods for power management selected from the group consisting of: getting a system power source, getting a system battery capacity, getting said system power state, adding a system state change event listener, removing said system state change event listener, setting said system power state, and getting a system power monitor object.

35. The method of claim 34,
wherein said applications and said programming interfaces are configured to execute on a virtual machine, and wherein said programming interfaces are interfaces between said applications and said virtual machine.

36. A method for managing power resources and power states of software and hardware of a computer system, the method being configured to execute without alteration on a plurality of computing platforms, the method comprising:

providing a package of programming interfaces for power management of the computer system, wherein said package of programming interfaces is configured to enable a plurality of applications to participate in managing power resources and power states of power-manageable software and hardware of the computer system, wherein said package of programming interfaces is configured to enable said applications to obtain power state data, wherein said power state data reflects a power state of said power-manageable software and hardware of the computer system;

implementing said package of programming interfaces between said applications and the computer system, wherein said interfaces are configured to enable said applications to be computing-platform-independent;

wherein said package of programming interfaces is further configured to enable said applications to obtain notification data regarding a plurality of power state transitions; and wherein said power state transitions are selected from the group consisting of: full power to power management active, power management active to full power, full power to sleep, full power to suspend, full power to off, power management active to sleep, power management active to suspend, power management active to off, sleep to full power, sleep to power management active, suspend to full power, suspend to power management active, and sleep to suspend.

37. The method of claim 36,
wherein said applications and said programming interfaces are configured to execute on a virtual machine, and wherein said programming interfaces are interfaces between said applications and said virtual machine.

38. The method of claim 36, wherein said package of programming interfaces is further configured to inform said applications of an event indicating a power state transition.

39. A method for managing power resources and power states of software and hardware of a computer system, the method being configured to execute without alteration on a plurality of computing platforms, the method comprising:

providing a package of programming interfaces for power management of the computer system, wherein said package of programming interfaces is configured to enable a plurality of applications to participate in managing power resources and power states of power-manageable software and hardware of the computer system, wherein said package of programming interfaces is configured to enable said applications to obtain power state data, wherein said power state data reflects a power state of said power-manageable software and hardware of the computer system;

implementing said package of programming interfaces between said applications and the computer system, wherein said interfaces are configured to enable said applications to be computing-platform-independent;

wherein said package of programming interfaces is further configured to enable said applications to obtain notification data regarding a plurality of power state transitions;

wherein said package of programming interfaces is further configured to inform said applications of an event indicating a power state transition; and wherein said event indicating said power state transition is selected from the group consisting of: full power to power management active, power management active to full power, full power to sleep, full power to suspend, full power to off, power management active to sleep, power management active to suspend, power management active to off, sleep to full power, sleep to power management active, suspend to full power, and suspend to power management active.

40. The method of claim 39, wherein said applications and said programming, interfaces are configured to execute on a virtual machine, and wherein said programming interfaces are interfaces between said applications and said virtual machine.

41. A method for managing power resources and power states of software and hardware of a computer system, the method being configured to execute without alteration an a plurality of computing platforms, the method comprising:

providing a package of programming inter faces for power management of the computer system, wherein said package of programming interfaces is configured to enable a plurality of applications to participate in managing power resources and power states of power-manageable software and hardware of the computer system, wherein said package of programming interfaces is configured to enable said applications to obtain power state data, wherein said power state data reflects a power state of said power-manageable software and hardware of the computer system;

implementing said package of programming interfaces between said applications and the computer system, wherein said interfaces are configured to enable said applications to be computing-platform-independent;

wherein said package of programming interfaces is further configured to enable said applications to obtain notification data regarding a plurality of power state transitions; and wherein said package of programming interfaces is further configured to provide one or more methods for power management selected from the group consisting of: receiving a system state change event, getting a new power state, getting a previous power state, and determining if a power state change can be opposed.

42. The method of claim 41, wherein said applications and said programming interfaces are configured to execute on a virtual machine, and wherein said programming interfaces are interfaces between said applications and said virtual machine.

* * * * *

UNITED STATES PATENT AND TRADEMARK OFFICE
CERTIFICATE OF CORRECTION

PATENT NO. : 6,131,166
DATED : October 10, 2000
INVENTOR(S) : Becky Wong-Insley

It is certified that error appears in the above-identified patent and that said Letters Patent is hereby corrected as shown below:

In the Claims:

Claim 10, col. 24, line 55, please change "get ting" to "getting".

Signed and Sealed this

Eighth Day of May, 2001

Attest:

NICHOLAS P. GODICI

Attesting Officer     Acting Director of the United States Patent and Trademark Office